US006298340B1

(12) United States Patent
Calvignac et al.

(10) Patent No.: US 6,298,340 B1
(45) Date of Patent: Oct. 2, 2001

(54) SYSTEM AND METHOD AND COMPUTER PROGRAM FOR FILTERING USING TREE STRUCTURE

(75) Inventors: Jean Louis Calvignac, Cary; Everett Arthur Corl, Jr., Raleigh; Anthony Matteo Gallo, Apex; Marco C. Heddes, Raleigh; Clark Debs Jeffries, Durham; Piyush Chunilal Patel, Cary; Mark Anthony Rinaldi, Durham; Colin Beaton Verrilli, Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/312,148

(22) Filed: May 14, 1999

(51) Int. Cl.⁷ ..................................................... G06F 17/30
(52) U.S. Cl. ................................. 707/3; 707/1; 707/100; 707/102; 707/103
(58) Field of Search ................................. 707/1, 3, 100, 707/102, 103

(56) References Cited

U.S. PATENT DOCUMENTS

| | | | |
|---|---|---|---|
| 4,464,650 | * 8/1984 | Eastman et al. | 341/51 |
| 4,468,728 | * 8/1984 | Wang | 707/1 |
| 5,136,580 | 8/1992 | Videlock et al. | 370/403 |
| 5,212,587 | * 5/1993 | Healey | 359/301 |
| 5,263,124 | * 11/1993 | Weaver et al. | 382/159 |
| 5,414,704 | 5/1995 | Spinney | 370/389 |
| 5,418,947 | * 5/1995 | Hsu et al. | 707/1 |
| 5,463,777 | 10/1995 | Bialkowski et al. | 707/102 |
| 5,541,911 | 7/1996 | Nilakantan et al. | 370/422 |
| 5,761,440 | * 6/1998 | De Marco et al. | 709/245 |
| 5,790,554 | 8/1998 | Pitcher et al. | 370/471 |
| 5,813,001 | 9/1998 | Bennett | 707/3 |
| 5,857,196 | * 1/1999 | Angle et al. | 707/102 |
| 5,873,078 | * 2/1999 | Angle et al. | 707/3 |
| 5,978,795 | * 11/1999 | Poutanen et al. | 707/3 |
| 6,000,024 | * 12/1999 | Maddox | 712/11 |

\* cited by examiner

*Primary Examiner*—Jack Choules
*Assistant Examiner*—Cheryl Lewis
(74) *Attorney, Agent, or Firm*—Joscelyn G. Cockburn

(57) ABSTRACT

A classification system includes a software managed tree testing bits from a key which labels an item. The bits are chosen by application of the Choice Bit Algorithm to the Rules in a Database of Rules. A controller including logic parses an unknown Key for bits to be tested in the decision nodes of a binary tree. Tests dictated by the tree are conducted in a predetermined way until all but one Rule from the database or all but a few Rules from the database are eliminated from consideration, whereupon the Key is fully tested by the one remaining Rule or in a lattice constructed of the remaining plurality of Rules, to determine an action to enforce on the item. Certain compare tests are used in the binary tree for the case that otherwise identical or similar rules are applied to integer ranges of key values which do not fall upon power of 2 boundaries. Furthermore, some very frequently occurring rules in such final tests might be designated as secondary rules, the remaining rules designated as primary rules, the entire decision tree recalculated using only primary rules, and the primary rules then connected to secondary rules only when logically necessary by means of a system of pointers making use of relative priorities of rules.

29 Claims, 10 Drawing Sheets

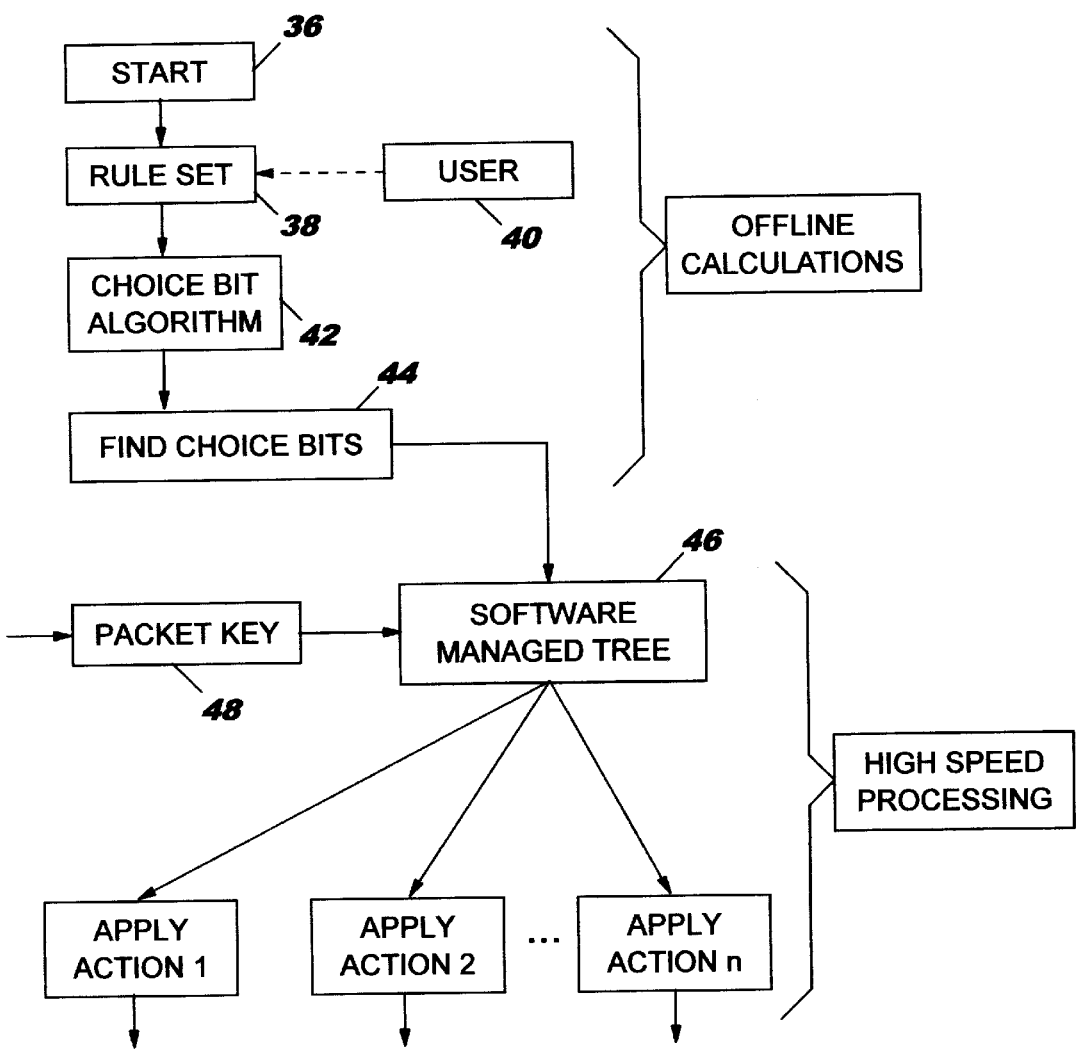

RULE DATA BASE FORMAT

SA = SOURCE ADDRESS
DA = DESTINATION ADDRESS
SP = SOURCE PORT
DP = DESTINATION PORT

IP FRAME FORMAT

FIG. 6

RULE DATA BASE

|  | SA | DA | SP | DP | PROTOCOL | ACTION |
|---|---|---|---|---|---|---|
| RULE 0 | | | | | | |
| RULE 1 | | | | | | |
| RULE 2 | | | | | | |
| RULE 3 | | | | | | |
| RULE 4 | | | | | | |
| RULE 5 | | | | | | |
| ⋮ | | | | | | |
| RULE N-1 | | | | | | |

SYSTEM AND METHOD AND COMPUTER PROGRAM FOR FILTERING USING TREE STRUCTURE

BACKGROUND OF THE INVENTION

1. Field of the Invention

The present invention relates to traffic management in a communications network and, in particular, to filtering of traffic in said network.

2. Prior Art

The use of filter systems to manage the flow of traffic in a communications network is well known in the prior art. In a conventional filtering system, selected characteristics of an unknown item are subjected to rules which are known to classify items. If the unknown item fits the criteria of a rule, then the action associated with that rule is taken. Rules may have priority so that an item which passes several rules is actually subjected to a unique action, namely that of the highest priority rule it fits. In some systems rules may be of several types, in which case the rule to apply would be the rule of each type which fits and has highest priority.

One straightforward or brute force way of filtering an item is to subject the item to all rules sequentially, in order of priority. Compared to the method disclosed herein, the sequential method is simple but slow. This brute force approach is acceptable only if the number of rules is small or speed is not essential. In a communications system where the universe could have tens or hundreds of rules and time is very critical, this brute force approach is not acceptable.

Another brute force way of filtering an item is to subject the item to all rules in parallel, then accumulate the results and find the rule with highest priority passed by the item. Compared to the method disclosed herein, the parallel method is simple and fast, but also expensive and inefficient. A specialized chip capable of performing parallel compares would be required to carry out the comparisons. Such a chip might not perform any other function. Consequently, the cost cannot be leveraged to a multifunction chip.

The prior art has improved the brute force methods by utilizing tree structures in the filtering process. U.S. Pat. No. 5,463,777 describes a tree structure in which the key segments of multiple bits (such as 32 bit segments) from the header of a frame are compared with chosen values at tree nodes. Results of the searches on segments are ANDed to produce a final result.

U.S. Pat. No. 5,574,910 also makes use of fixed length keys (such as 32 bits) and, in the case of a plurality of segments, ANDs results to reach a final decision.

U.S. Pat. No. 5,546,390 also teaches the advantages of choosing certain bits in building a search tree called a radix tree-type decision process. This method examines two or more bits at each tree branch. In fact, U.S. Pat. No. 5,546,390 distinguishes itself from its prior art in part by selecting two or more bits for each node in its decision tree nodes. Unfortunately, as mentioned therein, allowing 4, 8, or more branches at each node can result in wasted space for unused links. Those skilled in the art will recognize that it is not always feasible to find such combinations of bits in real rule sets.

U.S. Pat. No. 5,813,001 describes another search technique in which groups of bits from a search object are matched against groups of bits from entries in a knowledge base system. It is believed that this approach requires complex circuities or long processing time in order to perform the required group processing.

U.S. Pat. No. 5,136,580 uses a Programmable Logic Array (PLA) and a Content Addressable Memory (CAM) to recognize if a Destination Address (Recipient) and Source Address (Sender) are on the same LAN. If so, the frame is filtered and not forwarded to another LAN. Hence this system provides a limited filtering function.

U.S. Pat. Nos. 5,541,911 and 5,790,554 refer to filters in a general way, but appear not to disclose any specific structures or mechanism for filtering.

Even though the prior art patents may work satisfactorily for their intended purposes, none of the patents gives a mechanism for selection of bits to use at tree nodes.

SUMMARY OF THE INVENTION

In view of the foregoing, the present invention provides an improved method and apparatus for filtering.

The present invention presents five metrics for selection of bits. Actual filter rules sometimes apply to bounded ranges of data identifiers with integer boundaries which are not powers of 2. For example, in IP terminology, a filter rule might apply to port numbers 1 to 53. In this case the bits representing the port number in a key which fits the rule are certain combinations, namely combinations 000001 through 110101, not all 2^6 possible combinations of six binary bits. By testing inequalities with simple compare operations, the present invention allows such irregular ranges in rules, as will be explained below. Furthermore, the present invention uses metrics to solve the non-intuitive and important problem of finding the optimal bit.

As used in this document, metric means a quantitative measure of the optimal bit to choose. For large rules sets with many "don't care" entries and many bounded range entries in its rules, this choice can be non-intuitive and yet critical to algorithm performance.

Furthermore, those practiced in the art will recognize that filter rule tables often contain rules which cannot be differentiated by examination of one bit position or a combination of a few bit positions. For example, a rule set might contain a first rule which applies to a specific source address and any destination address, and a second rule which applies to any source address and a specific destination address. The rules might be otherwise identical. Such combinations appear when an administrator wishes to filter all traffic of a type in the same way but differentiated with respect to two directions, to and from a subnetwork. The present invention treats such cases by means of a lattice of tests (as opposed to a tree) described herein.

An algorithm termed "Choice Bit Algorithm" uses a certain metric to build a binary search tree based upon bits selected from items termed "rules" in a set or universe of rules. All our examples are couched in terms of Internet Protocol (IP) headers, but a fixed format header of any type could be used instead.

In IP, each Rule pertains to certain Keys which might be built with the following subsections: Source Address (SA), Destination Address (DA), Source Port (SP), Destination Port (DP), and Protocol (P). These data are respectively 32, 32, 16, 16, and 8 bits long and so a Key to be tested consists of 104 bits. The Choice Bit Algorithm finds certain of the 104 bits which are especially useful. Testing the few bits in effect eliminates all but one or all but a few rules from possible application. For some rules, testing inequalities by means of simple compare operations are also appropriate. The bit tests and compares are logically organized in a binary tree. The tree is mapped into a hardware enabled structure that tests bits at high speeds. Such testing results in just one rule or a small number of rules (called a leaf chain) which the Key might fit. In the former case, the Key is then tested in full by the rule. In the latter case, the Key is then tested in a lattice of tests using compares and full rule tests.

Each rule in the rule set is associated with an action which is taken if the rule is the highest priority rule which fits the key. Rules can intersect (one key fits two or more rules). In that case, rules can be given priority numbers 1, 2, 3, . . . , so that any two intersecting rules have different priorities (an administrator must declare which rule dominates if a key fits two or more). Thus if more than one rule remains to be tested after the bit tests and compares, the rules are tested in order of priority. A lower priority number designates a rule with higher priority.

If no fit is found at all, some default provision may be specified.

The method works, that is, produces an efficient, nearly balanced search tree, for the following underlying reasons. It can be shown using probability theory that the probability of observing exactly 1000 heads in 2000 tosses of a fair coin is about 1 divided by the square root of 1000 pi, about 0.018, a remarkably large value. If a range of heads is allowed such as 990 to 1009, the probability is increased to about 0.35. These surprisingly large probabilities can be applied to understanding the utility of the present invention. In 100 rules a few bit positions will correspond to least significant bits of the five components and are essentially random. Some other bit positions might be * (don't care) or heavily biased to 0. But in a real set of, say 100 rules, it is reasonable to assume that some bit position of the 104 bit positions will be essentially random. Considering the likelihood that about half the 100 random bits are 0 and half 1, testing that one bit in a key will eliminate about 50 of the rules from further consideration. Then, among the 50 remaining rules which in that bit conform to an input key, we seek a bit position which includes about 25 entries of 0 and 25 entries of 1. This process continues until perhaps ten bit tests have eliminated perhaps 95 or even perhaps 99 of the 100 rules from further consideration.

The foregoing and other features and advantages of the invention will be more fully described in the accompanying drawings.

BRIEF DESCRIPTION OF THE DRAWINGS

FIG. 4 shows a flowchart of the Frame Classification System according to the teachings of the present invention.

FIG. 6 shows a structure for the Rule Data Base.

DETAILED DESCRIPTION OF THE PREFERRED EMBODIMENT

The invention to be described hereinafter can be used in any environment in which one wishes to determine if an unknown item of fixed format is a member of a universe of items. It works well in a communications system in which there is frame classification or frame filtering. As a consequence, it will be described in that environment. However, this should not be construed as a limitation upon the scope of the invention since one skilled in the art could use the teachings in other environments in which one wishes to classify items. If the invention is used in such an environment, it is intended that the claims set forth below will be applicable.

Figure 1:
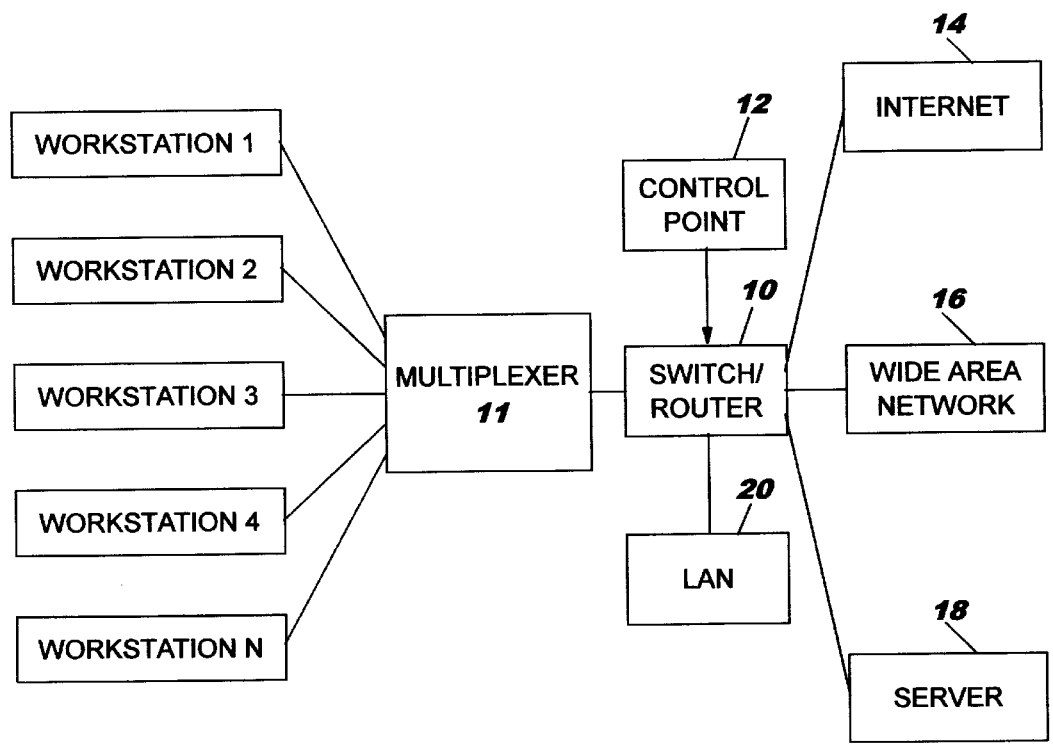
FIG. 1 shows a Communication System embodying the teachings of the present invention.

FIG. 1 shows a block diagram of a communications network in which the present invention is implemented. The communications network includes a Switch/Router 10 connected through a simple multiplex device (Multiplexer) 11 to Workstations 1 through N (a LAN), a Control Point 12, Internet 14 or some other form of Wide Area Network (WAN) 16, Server 18, and another Local Area Network (LAN) 20. A LAN can be ethernet, token-ring or any other local area network which might include many additional workstations. Those skilled in the art will understand that a great variety of combinations of such elements are possible in permutations of FIG. 1. In particular, some elements could be duplicated and others deleted.

As will be explained in more detail here below, the Switch/Router 10 accepts specification of choice bits and compares from Control Point 12. Thereafter, the Switch/Router examines choice bits in headers of frames passing through it and acts upon frames according to actions specific in rule data base. That is, using the rules or rule matching a particular frame, the Switch/Router 10 makes decisions such as permit or deny or quality of service for each packet it processes. In order to make these decisions, the invention described hereinafter efficiently builds a binary search tree for testing portions of a packet termed a Key of given length. The Key carries information contained in the header of a packet. The method requires preprocessing of the rules set at the Control Point 12, which is a general purpose computer. The results of the preprocessing are then mapped into a software managed tree, that is, a hardware enabled structure for testing bits in a key at high speed. Nodes are added or deleted or modified as the source set of rules changes.

Figure 2:
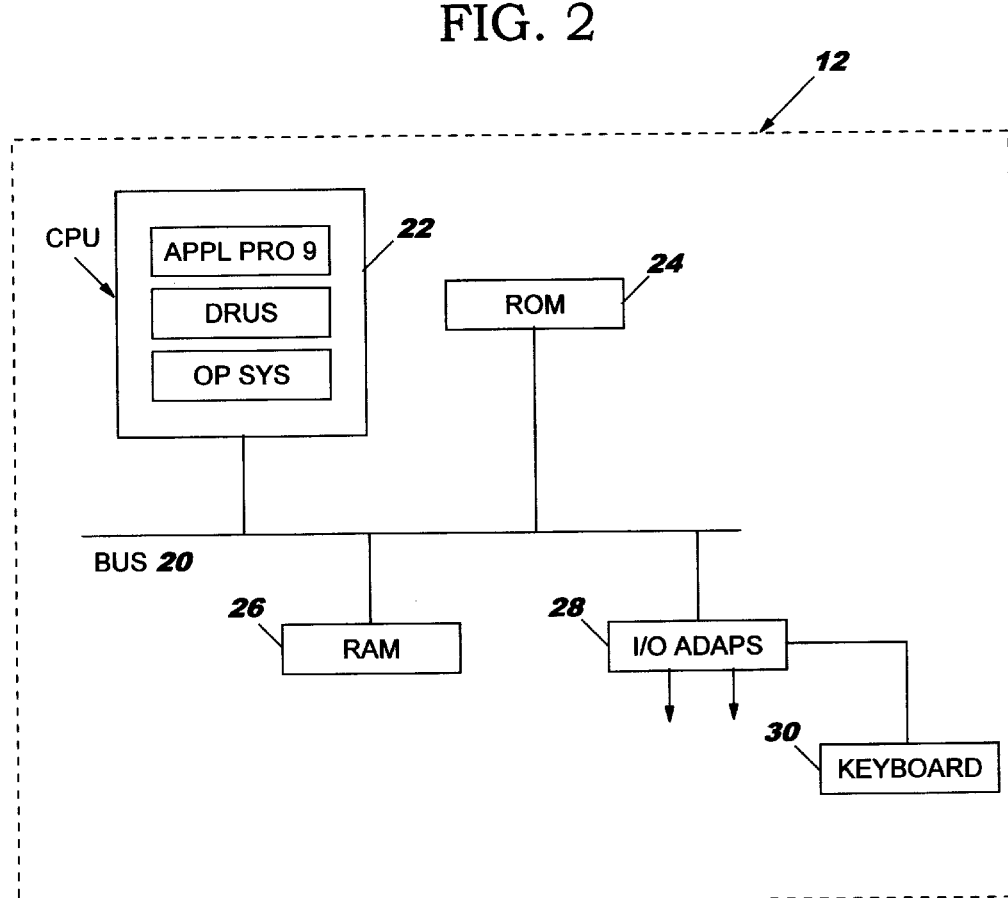
FIG. 2 shows a block diagram of the Control Point Processor.

FIG. 2 shows a block diagram for Control Point 12. In the preferred embodiment of this invention, the Control Point 12 is a general purpose computer comprising a Bus 20 to which CPU 22, ROM 24, RAM 26 and I/O Adapters (ADAPS) 28 are connected. The I/O Adapter 28 carries different types of I/O adapters for supporting different type of I/O devices. For example, a Keyboard 30 is coupled through a keyboard I/O adapter to Bus 20. The Keyboard 30 is used by an operator or network administrator for inputting the Rules database (details to be given hereinafter) into the CPU 22. Of course, other types of I/O devices such as a mouse, scanner, etc., can be connected to I/O Adapters 28. The CPU 22 includes a plurality of functions including Operating System (OPSYS), Drivers (DRVS), and several application programs (APPL PROGS). Among the application programs is the program which analyzes the database inputted by the operator to determine the choice bit and tree structure that is transmitted to the Switch/Router 10.

Figure 3:
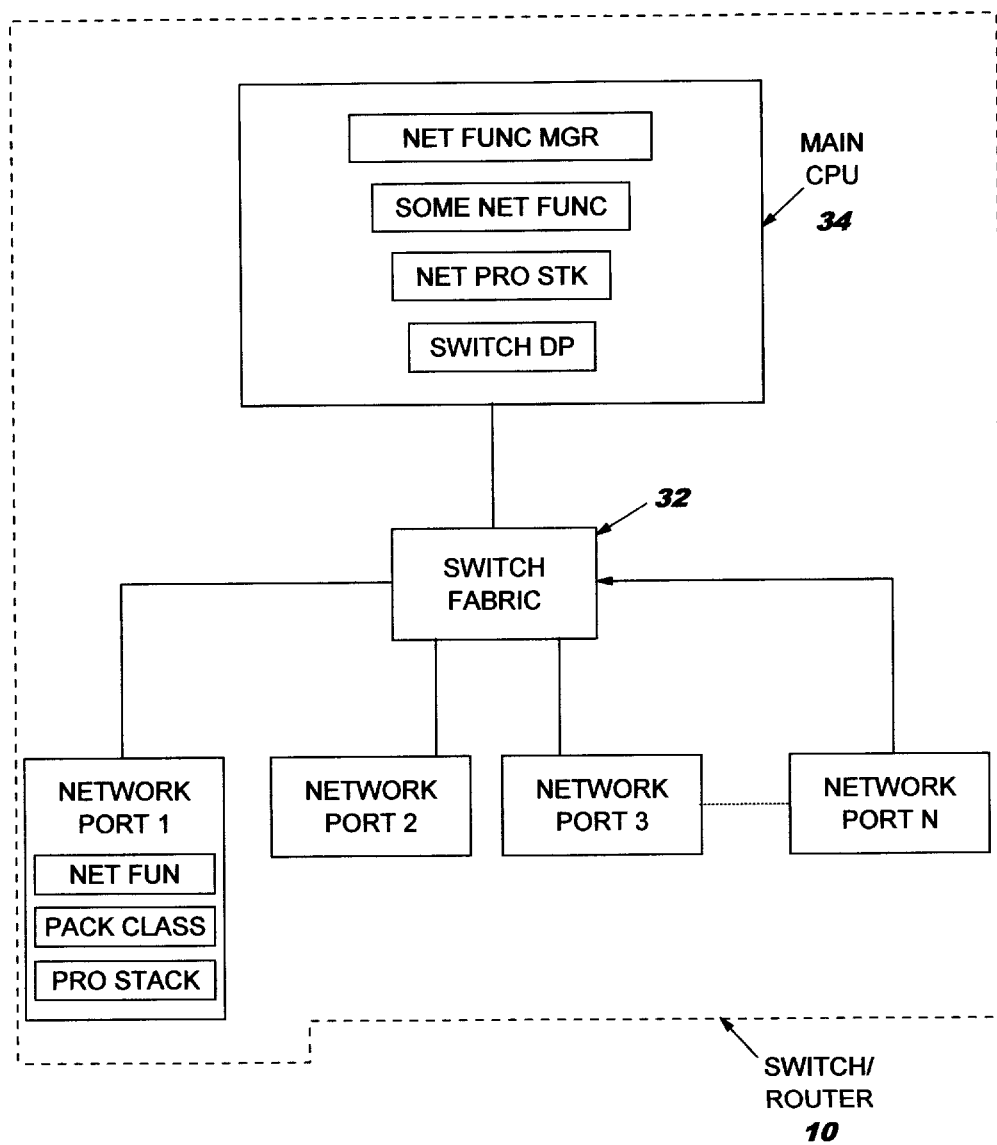
FIG. 3 shows a block diagram for the Switch/Router including the teachings of the present invention.

FIG. 3 shows a block diagram of the Switch/Router 10. The Switch/Router 10 includes Switch Fabric 32, Main CPU 34, and a plurality of Network Ports 1 through N. The Switch Fabric 32 can be a bus or cross-bar switch. The elements such as workstation, local area network, server, etc. are connected to the switch fabric through the Network Ports 1 through N. Network Port 1 shows a set of functions which are present in the network ports. The functions include Network Functions (NET FUNC) that recognize and forward packets using static or dynamic criteria or actions. Successful operation of a switch/router might entail temporary storage of packets, header modification, generation of congestion signals and actions, queue management according to priorities and congestion conditions within the switch/router and more widely in the network, reassembly of packets in formats of various protocols, and expeditious assignment of outbound packets to target ports. For the sake of interoperability with equipment made by various manufacturers, the switch/router must be operated in a manner consistent with OSI protocol stack standards and many other industry standards. In operation, a portion of the protocol stack is run in the network port and portions are run in the main CPU. In addition, packet classification (details given below) is performed at the network ports and network function software running on each network port is capable of making complex decisions based on that classification often using information downloaded from the main CPU manager functions. As a consequence, the main CPU no longer needs to be involved in examining and making a decision on every inbound packet. The network ports are embedded with a processor such as a pico-processor and memory which enable packet classification or filtering. Data movement through the switch fabric can be at high bandwidth so that the aggregated traffic between the ports passes at cumulative wire speed. As will be described herein below, the packet classifications in the ports are also performed at wire speed. As a consequence, the present invention performs the packet classification at high rate (wire speed) which does not cause any bottleneck in the communications network of FIG. 1.

FIG. 4 shows a flowchart of the process used at the Control Point 12 and the Switch/Router 10 to realize frame classification. Stated another way, the flowchart shows the relatively slow process taken at the Control Point 12 to determine from a rule set the choice bits and the relatively fast process taken at the Switch/Router 10 to filter a frame relative to the choice bits. The process steps labeled "Offline Calculations" are performed at the Control Point 12 (a general purpose computer) while the process steps labeled "High Speed Processing" are performed in the packet classification (Pack Class) function in each of the network ports (FIG. 3).

Still referring to FIG. 4, Block 36 is the entry point into the process. From Block 36, the process descends into Block 38 where a Rule set (details to be given herein below) is input by a User 40. The Choice Bit Algorithm 42 (details set forth below) operates on the Rule Set to find Choice Bits in Block 44 which are transmitted to the Software Managed Tree in Block 46. As stated previously, the Software Managed Tree is situated within the packets classification function in the network port (FIG. 3). The other input into the Software Managed Tree is the Packet Key in Block 48. As will be explained subsequently, the Packet Key is a portion of a frame which is received from an input such as the Internet, a Wide Area Network, LAN, etc. The Software Managed Tree tests bits in the Packet Key with selected bits from the Choice Bit Algorithm, and at the end, does a full scale compare between a rule in the Rule Set and the Key to determine if the packet matches the rule in the Rule Set. The process from Block 46 then descends into one of the Action Blocks labeled 1 through N. As will be explained subsequently, each rule has an action section. When the highest priority Rule which matches a Key is found, the action associated with that Rule is performed on the packet associated with the Packet Key.

Figure 4A:
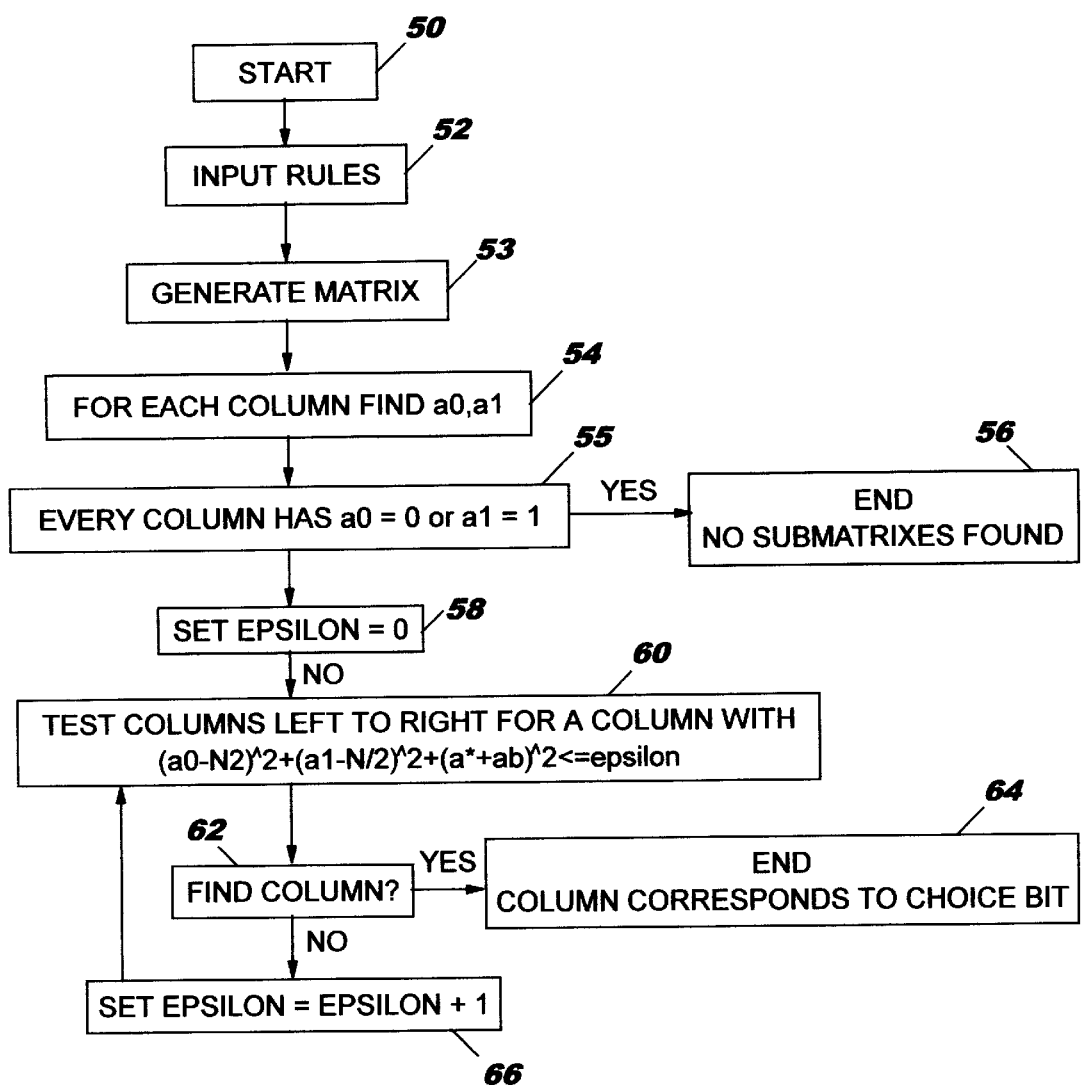
FIG. 4A shows a flowchart for the Choice Bit Algorithm.

FIG. 4A gives a flowchart diagram of the stored procedure Choice Bit Algorithm 42 and the process Find Choice Bits 44. The process begins in block 50. A set of rules in integer pair form (upper and lower integer limit in each component) or other equivalent form is entered by the user (Block 52). Software produces a rectangular matrix (Block 53) with entries 0, 1, *, or b. The matrix has N rows and m columns. Let the numbers of 0, 1, *, and b entries in a column of the matrix be denoted a0, a1, a*, ab (Block 54). If every column (Block 55) has either a0=0 or a1=1, then the algorithm ends (Block 56). No choice bit can be found. First, we look for a column with a*=0, ab=0, and a0=a1=N/2, so M5=0, Block 58 (discussed below). Sweeping from leftmost column 0 to rightmost column m−1, the Choice Bit Algorithm first seeks a column with $(a0-N/2)^2+(a1-N/2)^2+(a*+ab)^2<=0$, that is, exactly half 0 entries, half 1 entries, and no other entries (Block 60). If such a column is found (Block 62), it corresponds to the choice bit (Block 64). Else, increase (Block 66) the tolerance $\epsilon$ by 1. The Choice Bit Algorithm then seeks a column (Block 60) with $(a0-N/2)^2+(a1-N/2)^2+(a*+ab)^2<=1$. If such column is found, it corresponds to the choice bit (Block 64). Else, the Choice Bit Algorithm (Blocks 62, 66) seeks a column with $(a0-N/2)^2+(a1-N/2)^2+(a*+ab)^2<=2$, and so on.

If N is even, then the metric used here, $(a0-N/2)^2+(a1-N/2)^2+(a*+ab)^2$, is, of course, 0 (the optimal value) if we find a column with exactly N/2 entries 0, exactly N/2 entries 1, and no * or b entries. If N is odd, the optimal value is actually $(1/2)^2+(1/2)^2=1/2$. At any rate, the algorithm proceeds until a smallest possible value is found. The utility of this metric is partly in the degree to which it penalizes columns with many * or b entries or a poor balance of 0 and 1 entries. The present invention uses this metric or a similar metric to resolve the confusing issue of finding the optimal column or bit. Experience has shown the inventors that different metrics produce decision tress of greater or lesser complexity for a given ruler set.

Figure 4B:
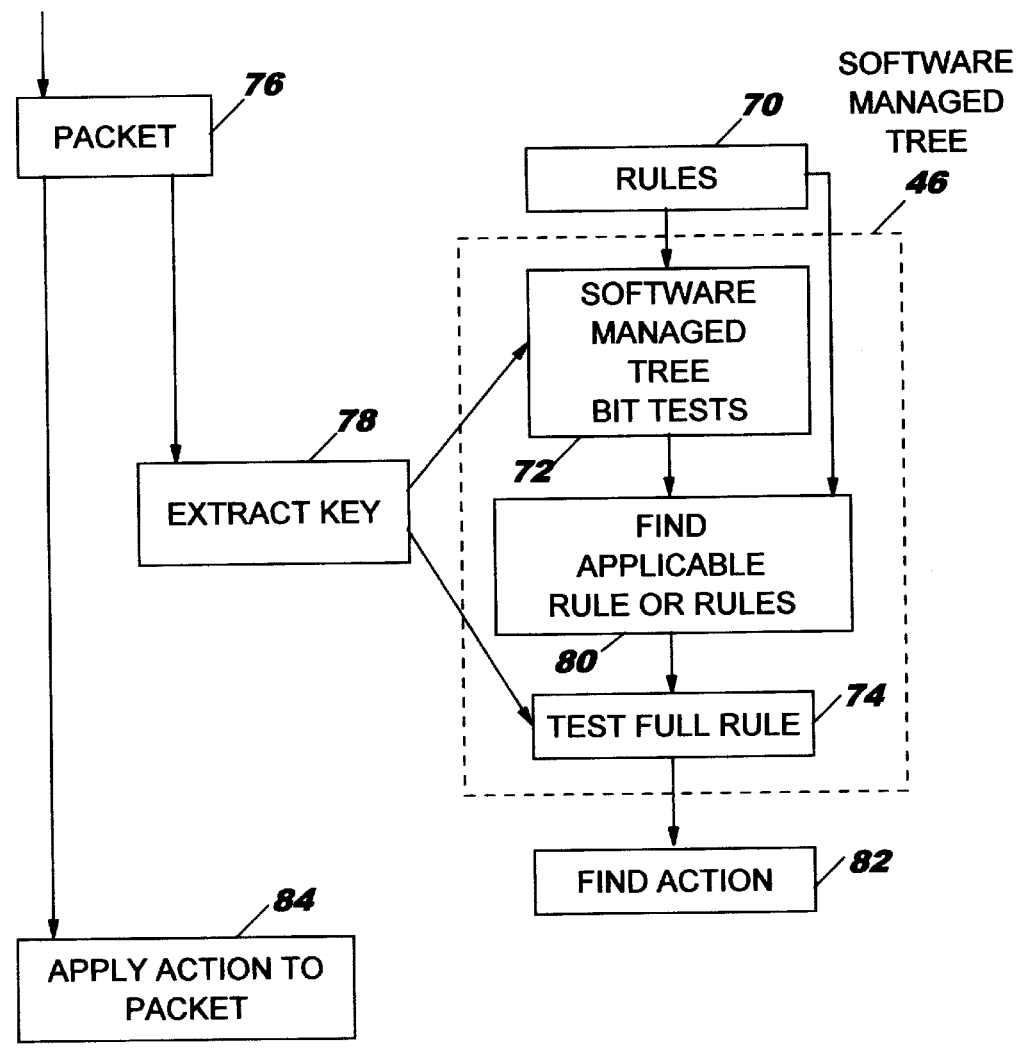
FIG. 4B shows a flowchart for the Software Manage Tree mechanism.

FIG. 4B gives a flowchart diagram including the Software Managed Tree 46 of FIG. 4A. In processing, rules (Block 70) are examined as in FIG. 4A. Choice bits are identified for use in the software managed tree 46. Rules are copied into software managed tree for full tests (Block 74). A packet arrives for processing (Block 76). From its header, or Key 78, choice bits are extracted and fed to the software managed tree bit tests, block 72. The tree outputs one rule (Block 80) or a small number of rules which might apply to the packet. The entire key of the header is tested by the rule or rules (Block 74). The rule which fits the key and has highest priority is found. The action of that rule is noted (Block 82) and applied to the packet (Block 84). The next packet arrives for processing and is Block 76.

Figure 5:
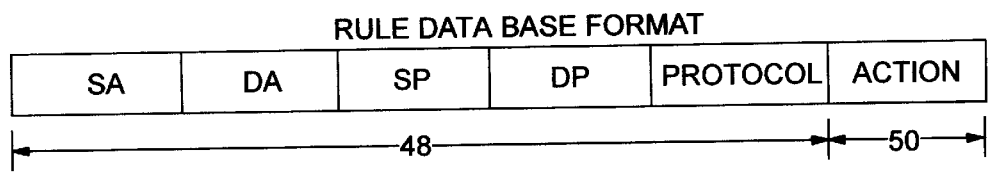
FIG. 5 shows a format for a Rule.

As stated above, the User 40 at the Keyboard 30 (FIG. 3), inputs a rule set to RAM 26 (FIG. 2). Referring to FIG. 5 for the moment, a format for each rule in the database is shown. Each rule includes a Header Portion 48 and an Action Portion 50. The header portion consists of upper and lower limits (possibly the same) for each component of the header portion of an IP frame or other fixed format header in some other protocol (hereinafter referred to as a Key). Thus the header portion includes upper and lower limits for:

Source Address (SA) 32 bits organized into four bytes of eight bits each with a dot (.) designating separation;

Destination Address (DA) 32 bits organized into four bytes of eight bits each with a dot (.) designating separation;

Source Port (SP) 16 bits;

Destination Port (DP) 16 bits;

Protocol (P) 8 bits;

Action 8 bits.

In an alternative but equivalent formulation,

Source Address (SA) four integers with values in the interval [0, 255] presented with a dot (.) designating separation such as 17.3.1.18, or one integer with value in the interval [0, 4,294,967,295] such as 285,409,554;

Destination Address (DA) four integers with values in the interval [0, 255] presented with a dot (.) designating separation or one integer with value in the interval [0, 4,294,967,295];

Source Port (SP) an integer with value in the interval [0, 65,535];

Destination Port (DP) an integer with value in the interval [0, 65,535];

Protocol (P) an integer with value in the interval [0, 255];

Action an integer with value in the interval [0, 255].

Every rule can be stated as a combination of ten integers, the values being the upper and lower limits in the five dimensions of the above integer values in a key which fits the rule.

Those skilled in the art will recognize that the above rule specifications pertain to the important but special case of IP (Internet Protocol) headers. The present invention applies to that case but also every other protocol case with fixed format headers. However, for the purpose of clarity, we illustrate the present invention in the context of IP.

Each of the keys which fit a rule can be expressed as binary 104 bit vectors. Let us consider the union of all keys which fit a rule. Some rules apply to exactly one key and so each of the 104 bit positions in the union is simply 0 or 1. Other rules have ranges in one component or several components. If a range has certain arithmetic limits, namely 0 to a power of 2, then certain consecutive bit positions attain all possible values. The convention is to designate such "don't care" or "wildcard" bit positions in a rule by the symbol *. If a range has certain other arithmetic limits, then many but not all possible binary combinations appear in the consecutive bit positions corresponding to the range. In the present invention we designate such bounded range consecutive bit positions in the union of all keys which fit a rule by the symbol b. In addition, rules expressed as 10-tuples of integers can also be expressed as such unions of keys which fit the rules.

Referring to FIG. 6, a rule database includes a set of rules 0 through N-1 which is stored in the memory (RAM 26) of the general purpose computer 12 (FIG. 2). As stated previously, the Rule database is entered by an operator via a terminal or other appropriate mechanism (e.g. scanner, etc.). The rule database therefore gives rise to a matrix with N rows and 104 columns. Each row in the matrix is the union of the keys which fit the rule of the same number. The Choice Bit Algorithm examines this matrix and uses one of five possible metrics to determine the best combination of choice bits to test at wire speed rate.

Figure 5A:
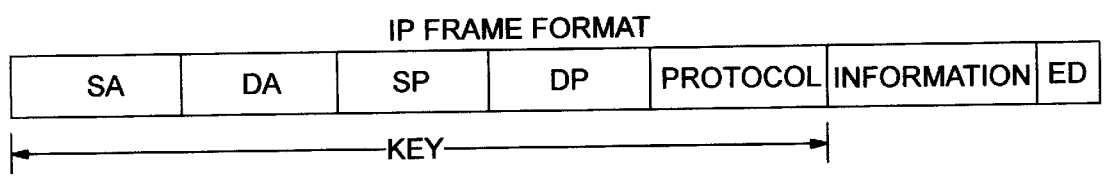
FIG. 5A shows an IP Frame Format.

Turning to FIG. 5A for the moment, an IP Frame Format is shown. The Frame Format includes a section termed "Key", an Information section, and an Ending Delimiter (ED) section. The Key section of the frame includes an SA field, DA field, SP field, DP field and P field similar to the Header Section 48 in the Rules database.

Every rule applies to one or more 104-bit keys with five dimensions (SA, DA, SP, DP, P). Let us define a rule matrix for input to our algorithm. The characters in the rule matrix which are permissible are 0, 1, * (don't care), or b (bounded range). Row j in the matrix is the union of all keys in 0, 1, *, b form which fit the rule of the same number j. The Choice Bit Algorithm starts with this matrix of 0, 1, *, and b entries.

The output of the Choice Bit Algorithm is a set of functions logically organized into a binary tree. The key is a 104-bit binary vector, as described above. Thus Key=(x0, x1, x2, . . . , x103)

where each component xi is 0 or 1. The tree of test functions [f0, f1, . . . , fq] has the structure shown in FIG. 7A. A key is presented to the root of the tree, that is, the binary function f0 is evaluated. In our method the function is simply the value of some bit in the key, a choice bit. If the value of f0 is 0, then we branch left in the tree and proceed to evaluate function f1. If the value of f0 is 1, then we branch right in the tree and proceed to evaluate function f2. This procedure continues until a leaf of the tree is reached. Binary trees for decision making are well known to those practiced in the art. At a leaf of a tree (termination of all decisions), only one rule remains to be considered or only a few rules remain to be considered. The key is then tested by the remaining rule, or if more than one, by the remaining rules in order of priority.

Before describing a general approach to the algorithm according to the teachings of the present invention, an example of its use follows:

For the purpose of illustration, let us use rules for keys of only eight bits, not 104. Table 1 below shows the Rule database with five filter rules, R0 through R4, for Keys composed of eight-bit binary vectors (x0, x1, . . . , x7).

TABLE I

|    | x0 | x1 | x2 | x3 | x4 | x5 | x6 | x7 |
|----|----|----|----|----|----|----|----|----|
| R0 | 0  | 0  | 0  | 0  | 1  | 0  | 1  | *  |
| R1 | 0  | 0  | 0  | 1  | 1  | 0  | *  | *  |
| R2 | 1  | 1  | 1  | 0  | 0  | b  | b  | b  |
| R3 | 1  | 1  | 1  | 0  | 0  | 1  | b  | b  |
| R4 | 1  | 0  | *  | *  | *  | *  | *  | *  |

Thus, for example, the keys which fit Rule 1 are 00011000, 00011001, 00011010, and 00011011. Let us also suppose in the table that in Rule 2 the b values for x5, x6, x7 can be any binary combination with value from one to four; hence the b bit combinations are actually 001, 010, 011, and 100. Furthermore, let us suppose in Rule 3 that x5=1, x6, x7 can be any binary combination with value from five to seven; hence the x5, x6, x7 bit combinations in Rule 3 are actually 101, 110, 111. Thus this simple table serves to exemplify the much longer and more complex tables of real rule sets.

As pointed out above, the Rules database would have been entered by an administrator in the general purpose computer in the Control Point. Assume a key (associated with the header of a frame to be tested in the tree) is 11100101. As stated above, one brute force way of testing the key with the rules would be to compare sequentially the key with each rule in the database. With this approach, we test all eight bits and find that Rule 0 does not apply. Likewise Rules 1 and 2 do not apply. Then we try Rule 3. This time we see that the rule fits, so we enforce the action associated with Rule 3 (such as permit or deny or some quality of service value).

Figure 7A:
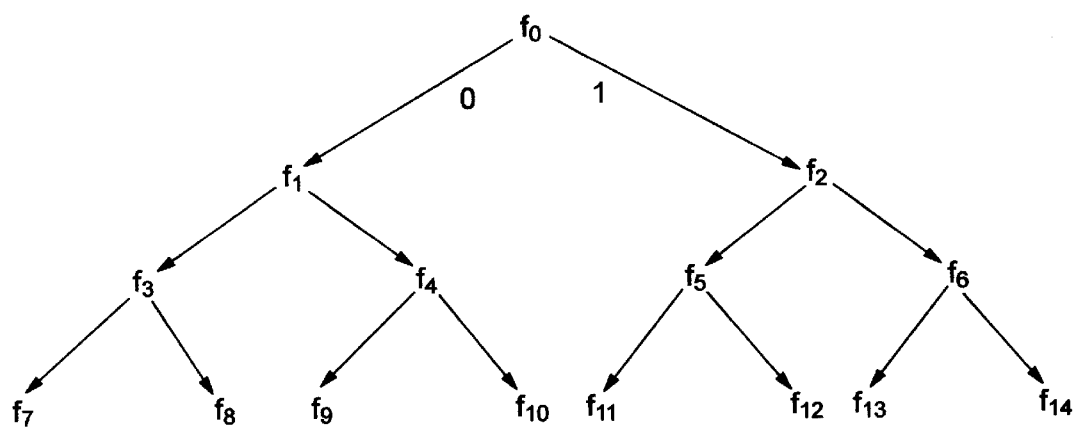
FIG. 7A shows a tree of test functions according to the teachings of the present invention.

By contrast to the above sequential search, the Choice Bit Algorithm of the present invention produces a tree structure of the general form shown in FIG. 7A. In the tree we branch left if 0 (false), else right.

Figure 7B:
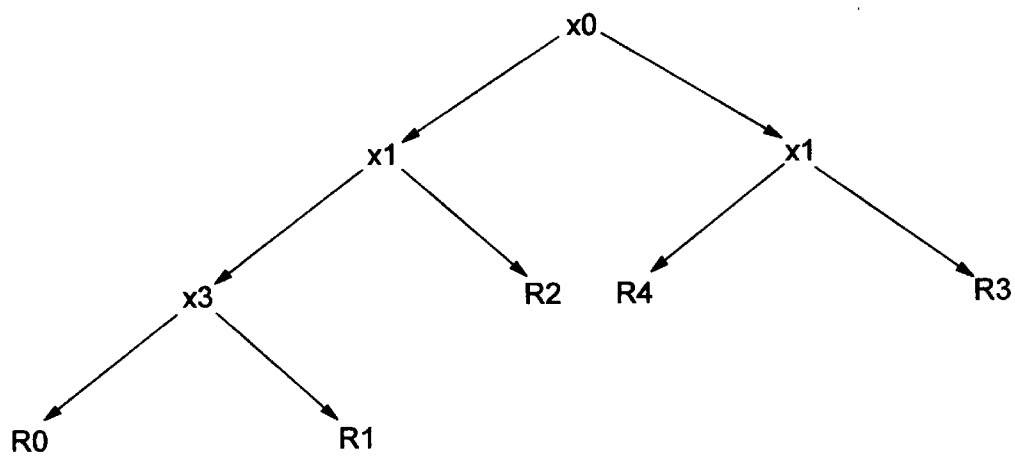
FIG. 7B shows a tree structure for a small example of five rules in Table 1.

FIG. 7B shows a tree generated from Table 1. The specific solution in FIG. 7B is generated as follows. For this example, N=5, so N/2=2.5. The first column (Table 1) has a0=2, a1=3, a*=0, ab=0. Thus, M5 has value $(2-2.5)^2+(3-2.5)^2=0.5$. evaluated similarly. For $\epsilon=0$, no column has M5<=0. So we increment $\epsilon$ to 1. Column x0 now satisifies M5<=1. So our first bit is x0, forming the root of the tree.

The x0=0 submatrix is:

|    | X0 | X1 | X2 | X3 | X4 | X5 | X6 | X7 |
|----|----|----|----|----|----|----|----|----|
| R0 | 0  | 0  | 0  | 0  | 1  | 0  | 1  | *  |
| R1 | 0  | 0  | 0  | 1  | 1  | 0  | *  | *  |

Here N=2 so N/2=1. The Choice Bit Algorithm find M5 for column X3 is $(1-1)^2+(1-1)^2+(0+0)^2=0$, and so bit x3 is chosen in the tree (FIG. 7B).

Further iteration results in the tree shown in FIG. 7B. In particular, * and b entries are accommodated by our metric and algorithm.

The present invention teaches which bits to choose for testing at different nodes of the tree. It also teaches that some bit positions in realistic rule sets are likely to be essentially random, hence it can be expected that a nearly balanced and efficient tree can be built from such choices. Note in particular the use of an inequality in FIG. 7B to discriminate between Rule 2 and Rule 3.

In general, the Choice Bit Algorithm applied to a matrix of N rules attempts to find a column with approximately N/2 entries 0 and approximately N/2 entries 1. Upon doing so, the matrix is used to produce two submatrices. The first submatrix consists of all rows from the original matrix which are not 1 in the chosen column. The second submatrix consists of all rows from the original matrix which are not 0 in the chosen column. This process is continued until further generation of any submatrix by this means is impossible, that is, until every column of every submatrix has either no 0 entry and or no 1 entry (or both). Those practiced in the art will immediately recognize the utility and efficiency of this algorithm, provided that at each step a suitable column (bit position) can be chosen.

The choice of column can be accomplished by minimizing one of several closely related metrics. For a column in a matrix of 0, 1, *, b entries with N rows, let a0=number of 0 entries
a1=number of 1 entries
a*=number of * entries
ab=number of b entries The present invention includes use of one of the following metrics applied to columns with at least one 0 entry and at least one 1 entry (a0>0, a1>0):

M1=max {a0+a*+ab, a1+a*+ab }

M2=$(a0-N/2)^2+(a1-N/2)^2$

M3=$\|a0-a1\|+a*+ab$    (here $\|\ \|$ denotes absolute value)

M4=$(a0-N/2)^12+(a1-N/2)^2+a*^2+ab^2$

M5=$(a0-N/2)^2+(a1-N/2)^2+(a*+ab)^2$

In general, all five metrics yield similar trees for realistic rule sets of 100 rules or so. On the basis of experience we favor M5. The pseudo-code given below use M5, but those skilled in the art will readily understand how any of the other four metrics might be used instead.

The consequences of using M5 can be illustrated as follows. Suppose in a set of 100 filter rules the associated rectangular matrix has a column with a0=45 (that is, 45 binary 0 entries), a1=45, a*=5, and ab=5. The M5 value of the column is therefore 150. Using the corresponding bit as a decision bit results in rule sets of 55 each. Suppose a second column has no * or b entries and a0=80, a1=20. The M5 value of the second column is therefore 1800. Using the corresponding bit as a decision bit results in rule sets of 80 and 20 rules. Clearly the first column with lower (better) M5 value yields a much more beneficial rule split. Similar guidance is provided by use of the other four metrics. In this example, the answer is actually obvious. However, use of M5 guides our choice in nonobvious choices, a strength of the present invention.

The result of iterating such choices together with a compare is precisely the tree of tests in FIG. 7B. Note that the bits chosen by the Choice Bit Algorithm might be from any positions in the key. As a general rule, fewer machine cycles are required to test a single bit than to match a key against a rule. Furthermore, testing a single inequality requires fewer machine cycles than testing a plurality of inequalities in a full rule test.

The Choice Bit Algorithm for favorable rule sets yield a tree of depth approximately $\log_2(N)$, where depth is the maximum number of bits to test before eliminating all but one rule from consideration. The goal of the algorithm is the construction of nearly balanced trees of binary searches and a minimal number of compares followed by a minimal number of full rule tests to be conducted in a lattice of tests to be described below.

A more general description of the Choice Bit Algorithm and process according to the teachings of the present invention will now be given.

Testing Bits

Statement of problem: Given a matrix of N (N>1) distinct rows of 0, 1, *, b entries, each of length m (m>1 and N<$2^m$), find a column of the matrix which minimizes a metric M1, M2, M3, M4, M5 defined above or a similar metric.

The problem can be solved by the following Choice Bit Algorithm. The metric M5 appears in line 14 of the program, and use of another metric would entail simply replacing M5 in that line.

Here is pseudo-code the algorithm for the metric M5.

Define a set of indices I:={0, 1, 2, . . . , N−1}.
Define a set of indices J:={0, 1, 2, . . . , m−1}.
Define a set of indices K:=J.
Define four integers a0:=0, a1:=0, a*:=0, ab:=0.
Define an N-by-m matrix V with 0, 1, *, b entries $\{V_{ij}\}$.
   //this is the rule matrix
Define the binary-valued function f(x0, x1, . . . , xm−1)=0.
   //the initial value off is 0.
Define an integer $\epsilon$:=0. //$\epsilon$ is the error by which a partition is not exactly half of V 1. Set j=0.
2. Find a0:=number of all $\{V_{ij}\}$ with i in I and $V_{ij}$=0.
3. Find a1:=number of all $\{V_{ij}\}$ with i in I and $V_{ij}$=1.
4. If a1=0 or a0=0, delete index j from J; else, keep j in J.
5 5. If j=m−1, goto 7; else, 6. Set j:=j+1, goto 2

//all 0 and all 1 columns in $\{V_{ij}\}$ are deleted

7. If J is empty, write "no partition possible" and end; else
8. Set K:=J.
9. Set k:=smallest entry in K.
10. Find a0:=number of all $\{V_{ik}\}$ with i in I and $V_{ik}=0$.
11. Find a1:=number of all $\{V_{ik}\}$ with i in I and $V_{ik}=1$.
12. Find a*:=number of all $\{V_{ik}\}$ with i in I and $V_{ik}=*$.
13. Find ab:=number of all $\{V_{ik}\}$ with i in I and $V_{ik}=b$.
14. If $(a0-N/2)^2+(a1-N/2)^2+(a*+ab)^2 \leq \epsilon$, write "Choice Bit is Xk " and end; else
15. Delete the selected index k from K.
16. If K is nonempty, goto 9; else
17. Set $\epsilon:=E+1$
18. Goto 8.

The Choice Bit Algorithm finds the best component of x to test to partition the rule set into subsets so that the difference in size between the subsets is minimized and the number of nonbinary values in the column is minimized. Line 14 in the above pseudo-code can be modified to use other metrics.

Furthermore, those skilled in the art will recognize that other programs mights easily be devised which also find the column minimizing the metric function in Line 14. The present invention is meant to include any such program which finds the column in the rule matrix with minimum metric function value.

After completion of the Choice Bit Algorithm with choice bit xk, two submatrices can be defined. The first is the submatrix consisting of all rows from the original matrix with 0, *, or b in column k; the second is the submatrix consisting of all rows from the original matrix with 1, *, or b in column k. The Choice Bit Algorithm is then applied iteratively to such submatrices until no more choice bits can be found.

The general outcome of the above procedure is a binary tree of bit tests. The tree has n nodes and n+1 leaves. Each leaf consists of one rule or a small number of rules which cannot be differentiated using bit choices. We refer to such a set of one or more rules as a leaf chain of rules. The rules in a leaf chain are listed in an order of nondecreasing priority number.

Testing Rules in Leaf Chains

In general, two or more rules can still be applicable to a key after the Choice Bit Algorithm can find no further columns with both at least one 0 entry and at least one 1 entry. In this situation, the rules are characterized as intersecting. The remaining rules have in some bit positions some binary entry (0 or 1 but not both) and some * or b entries. The rules can still be organized to take advantage of the exact portions. For example, in a leaf chain with three intersecting rules R1, R2, R3 in order of decreasing priority, we can test the rules as follows in the lattice set forth in Table II. (Branch left if false, else right.)

In the Table II, the lattice branches left if false, else right.

TABLE II

Bit Choice Tree

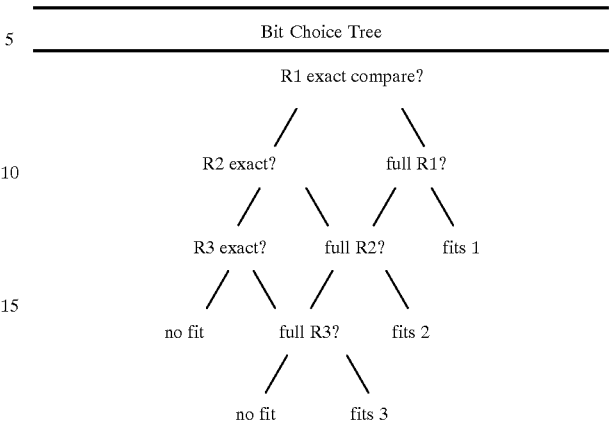

Here, an exact compare refers to testing a component with exact values, while a full test refers to testing a key with respect to all the ranges in a rule. Note the worst case is one exact compare plus three full rule tests. If in this example all three rules are equally likely with probability 0.25 to apply, if the conditional probability that passing exact test i implies passing full test i is nearly 1, and if the probability that a key fits none of the rules is also 0.25, then we expect to test on average 9/4 exact compares and 3/4 full compares per key. Those skilled in the art will understand the benefit of such a lattice of tests when a full rule test cost ten times the cycles of a simple exact test.

Table III shows an example of a rule set with nineteen (19) actual rules numbered 0 through 18, in sequential order of priority.

TABLE III

| Rule | SA | DA | SP | DP | | Protocol |
|---|---|---|---|---|---|---|
| 0 | 191.23.2.2 | 191.23.2.4 | 53 | *.* | | 6 |
| 1 | 191.23.2.2 | *.*.*.* | | 53 | *.* | 6 |
| 2 | 191.23.2.2 | *.*.*.* | | 53 | *.* | 17 |
| 3 | 190.12.*.* | 190.12.1.* | 123 | 123 | | 17 |
| 4 | 190.12.*.* | *.*.*.* | | *.* | 87 | 6 |
| 5 | 190.12.*.* | *.*.*.* | | *.* | 111 | 6 |
| 6 | 190.12.*.* | *.*.*.* | | *.* | 111 | 17 |
| 7 | 190.12.*.* | *.*.*.* | | *.* | 2049 | 17 |
| 8 | 190.12.*.* | *.*.*.* | | *.* | 2049 | 6 |
| 9 | 190.12.*.* | *.*.*.* | | *.* | 512 | 6 |
| 10 | 190.12.*.* | *.*.*.* | | *.* | 513 | 6 |
| 11 | 190.12.*.* | *.*.*.* | | *.* | 514 | 6 |
| 12 | 190.12.*.* | *.*.*.* | | *.* | 515 | 6 |
| 13 | 190.12.*.* | *.*.*.* | | *.* | 540 | 6 |
| 14 | 190.12.*.* | *.*.*.* | | *.* | 60000–61000 | 0 |
| 15 | 190.12.*.* | 191.1.1.0000**** | *.* | 444 | | 6 |
| 16 | 190.12.*.* | 191.1.1.0000**** | *.* | *.* | | 6 |
| 17 | 191.1.1.* | *.*.*.* | | *.* | *.* | 6 |
| 18 | 191.1.1* | *.*.*.* | | *.* | *.* | 17 |

As described previously, each rule gives rise to a union of binary keys which fit the rule. The union can be represented by a 104 entry vector with 0, 1, *, and b entries. The only rule with b entries happens to be rule 14. Every rule has some * entries.

Two rules intersect if at least one key fits both rules. If two rules intersect, then the one that occurs earlier in the list dominates. The priority numbers of rules in a rule set can be defined as follows. A rule has priority number 1 if no rule dominates it. If the only rules which dominate a rule are of priority number 1, then the rule has priority number 2. If the only rules which dominate a rule have priority numbers 2 or less, then the priority number of the rule is 3. And so on.

In the above example, the rules with priority number 1 are {0, 2, 3, 4, 5, 6, 7, 8, 9, 10, 11, 12, 13, 14, 15, 17, 18}. Rules with priority 2 are {1, 16}. Rule 0 dominates Rule 1 and rules 4, 5, 8, 9, 10, 11, 12, 13, 14, 15 all dominate Rule 16.

Figure 8:
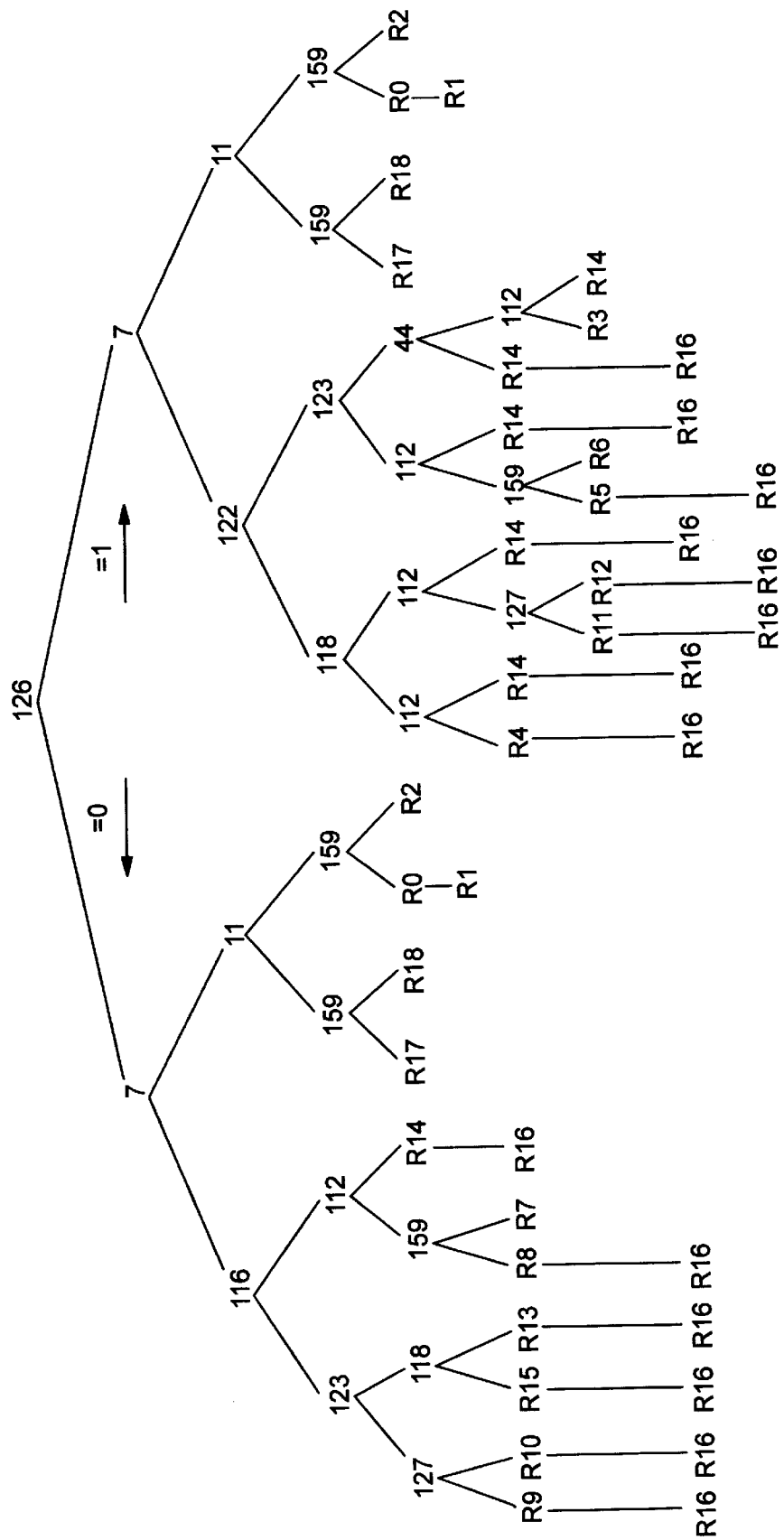
FIG. 8 shows a tree structure for a set of 19 actual rules in Table II.

For the sake of computational simplicity, let us pad the last three of the five of the components to 32-bits, so for example, column 159 in the rule matrix (not shown) actually refers to the last of the protocol bits. Using the Choice Bit Algorithm set forth above leads to the tree structure in FIG. 8. As stated above, the left branches in the tree structure are taken with bit value 0 and right branches are taken with bit value 1. As is evident from reviewing the tree, it has 25 bit test nodes for the 19 rules. It has a maximum of depth of six bit test nodes and at most two 10 rule nodes in its 26 leaf chains. (If two or more rules appear in a leaf, we refer to the rules as listed in a leaf chain. The number of leaf chains is always one more than the number of bit test nodes.) As discussed above, when a key from a packet is tested by a bit test in the tree structure in FIG. 8, the time required to make the determination is much less than that a full rule test.

Noting that Rule 16 appears many times as the terminal test in leaf chains, those skilled in the art will recognize the utility of using a leaf pointer from the first rule in each such leaf chain to a single copy of Rule 16. Generalizing this advantage, the present invention further teaches that if a small subset of rules is found to be very common after building a tree in accordance with the Choice Bit Algorithm, then those rules might be designated as "secondary." The remaining "primary" rules as a subset of the full rule set can be resubmitted to the Choice Bit Algorithm, resulting generally in a smaller tree with smaller leaf chains. At the conclusion of a search of the tree built from primary rules, each leaf might point to zero, one, or more secondary rules to be searched sequentially. The number of secondary rules to search depends upon the priority numbers of a primary rule which a key fits and the various priority numbers of the secondary rules. That is, the relative priority numbers of rules dictate to which secondary rules a primary rule should point.

For example, if a primary rule of higher priority than any secondary rule already fits a key, then the search points to no secondary rules. As a second example, if a primary rule of higher priority than some but not all secondary rules already fits a key, then it must point only to those secondary rules of higher priority. As a final example, if the search of the primary rules reaches a leaf chain and the rules therein do not fit the key, then the final primary rule in the leaf chain will still point generally to a subset of secondary rules which are not automatically eliminated from consideration by the path taken through the primary tree. A compromise regarding the numbers of rules designated as primary rules and as secondary rules can be reached to accommodate various speed and memory occupancy goals.

While the invention has been described with the specific embodiment, it will be obvious to those skilled in the art that changes in both form and/or detail may be made without a departure from the scope and spirit of the invention.

Having thus described our invention, what we claim is as follows:

1. A method for generating a search tree including the acts of:
    (a) providing, in a storage, a set of N rules wherein each rule in the set of rules is being represented by the union of bit patterns passed by the rule, so each bit position is 0, 1, * (corresponding to p>0 adjacent bit positions and a rule which applies to all $2^p$ possible binary values in a range of values in a segment of a rule), or b (corresponding to q>1 adjacent bit positions and a rule which applies to some (>0) but not all $2^q$ possible binary values in a range of values in a segment of a rule);
    (b) identifying at least a column in said set of N rules with a0=the number of 0 entries, a1=the number of 1 entries, a*=the number of * entries, and ab=the number of b entries, having most entries 0 or 1 and having about equal numbers of 0 and 1 entries;
    (c) partitioning said column into two new rule submatrices, wherein the first one of the two new rule submatrices includes all rows from the original set of rules with 0, *, or b in the selected column and the second one of said two new rule submatrices includes all rows from the original set of rules with 1, *, or b in the selected column; and
    (d) repeating such a partition procedure on submatrices until no further partition is possible.

2. The method of claim 1 wherein a metric is used to identify the column.

3. The method of claim 2 wherein the metric includes the expression $$M5=(a0-N/2)^2+(a1-N/2)^2+(a*+ab)^2.$$

4. The method of claim 1 wherein the set of rules is arranged in an N-by-m matrix with each row having m elements in it.

5. The method of claim 1 further including the acts of in the case that one or a few rules appear very frequently as terminal rules in many leaf chains, designating said rules as "secondary," designating all other rules as "primary," recalculating a bit choice and compare tree using primary rules only, and organizing the secondary rules in a set of rules to be tested sequentially or in lattices with pointers from certain primary rules to certain secondary rules determined by relative priorities of the rules.

6. The method of claim 5 further including the act of if a primary rule of higher priority than any secondary rule already fits a key, no secondary rules are selected for further testing.

7. The method of claim 5 further including the act of if a primary rule of higher priorities than some but not all secondary rules already fits a key, pointing the primary rule of higher priority to a lattice of only those secondary rules of higher priority with which the primary rule of higher priority intersects.

8. The method of claim 5 further including the act of if the search of primary rules reaches a leaf chain and no primary rules fit the key, the final primary rule in the leaf chain will point generally to a subset of secondary rules which are not automatically eliminated from consideration by the path taken through the primary tree.

9. A method for filtering comprising the acts of:
    (a) providing a binary search tree comprising of single bit test nodes, certain inequality tests for the purpose of discriminating among two or more rules with bounded ranges, and rules listed in order of priority at terminal nodes (leaf chain nodes) of the bit test nodes and compare nodes;
    (b) receiving a frame including a key section;
    (c) selecting bits from the key section of said frame and testing against single bit test nodes and compare nodes on said binary search tree;

(d) repeating step (c) until the single bit branches to at least one rule or a few remaining rules in a leaf chain; and (e) testing the key section of the frame against the at least one single remaining rule.

10. The method of claim 9 wherein the single bit branches to multiple intercepting rules including R1, R2 and R3 illustrated in the following lattice:

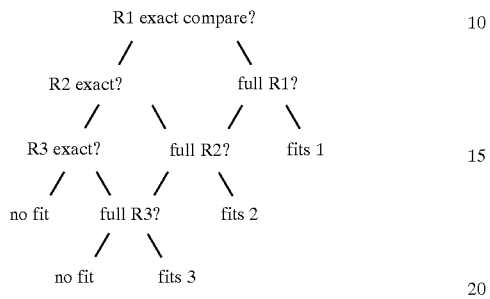

wherein R1, R2 and R3 are arranged in order of decreasing priority with partial exact compare followed by full compare if the partial exact compare is True or partial exact compare of the next rule in order if partial exact compare of a rule being considered is false.

11. The method of claim 9 further including the acts of assigning at least one specified action to the rule; and
performing the action to said frame if a match occurs in step (e).

12. The method of claims 9 or 11 wherein the binary search tree is generated from a set of rules configured in an N-by-m matrix with each of the rules having dimension m.

13. A method for determining if an item is a member of a universe of items comprising the acts of:
(a) storing, in a memory, a set of expressions representative of the universe of items;
(b) using a software or hardware program to access the set of expressions and generating therefrom a binary search tree structure having single bit test nodes;
(c) providing an expression representative of the item;
(d) testing selected single bits from the expression representing the item against single bits of the search tree;
(e) repeating act (d) until at least a leaf consisting of one rule or a few remaining rules of the tree is encountered on said search tree; and
(f) comparing each bit in the provided expression with like bits in the at least one encountered rule expression wherein a match indicates the provided expression as being a member of the universe of Items.

14. The method of claim 13 further including the acts of mapping the bit test and bit compare tree into a hardware enabled structure prior to searching said tree with selected bits from the provided expression.

15. A method of managing traffic flows within a communications network comprising the acts of:
(a) using selected bits extracted from expressions representing a universe of items to generate a binary tree structure having single bit nodes and at least one expression branching from selected ones of the single bit nodes,
(b) generating a hardware tree structure from the software tree of act (a);
(c) receiving an item;
(d) correlating selected bit from the item with single bit nodes of the software managed tree;

(e) repeating act (d) until a node branches to at least one expression; and
(f) comparing each element in the item with like elements in the at least one expression.

16. A classification system comprising:
a memory;
a database of items stored in said memory;
a Central Processing Unit (CPU);
a computer program to be executed on said CPU, said computer program causing said CPU to access the memory, parsing the database and generating therefrom a search tree wherein the root of said search tree relates to a selected bit in the database, nodes on the search tree relate to selected bits or comparisons of bits, and branches relate to 0 or 1.

17. The classification of claim 16 further including:
a circuit arrangement for parsing the key (selected portions) of an unknown item for bits similar to bits identified at nodes of said tree and, if found, searching the tree in a predetermined order until at least one item in the database is identified, wherein a full comparison on all the identifying data in the item is made to determine the action to apply to the item.

18. The classification system of claim 17 wherein the predetermined order is dictated by values extracted from the key at bit positions common to said key and said tree.

19. The binary tree classification system of claim 17 wherein the predetermined order includes left of the node if the value is 0 and right of the node if the value is 1.

20. The classification system of claim 16 wherein items in the database include Rules having a key section and an action section.

21. The classification system of claim 16 wherein the items in the database are identified by symbols including 0, 1, * (don't care), or b (bounded range).

22. The classification system of claim 20 wherein the union of keys satisfying each rule in the database is configured as a row in a Rectangular Matrix, with the Rectangular Matrix having N rows (the number of rules) and m columns (the total dimension of the keys to be tested).

23. The classification system of claim 20 wherein the key section includes a Source Address (SA), Destination Address (DA), Source Port (SP), and Destination Port (DP), and Protocol (P), or any other such fixed, standardized identification format.

24. A communications system comprising:
at least one communications network;
a control point provided in a general purpose or dedicated computing device; and
a switch/router coupling the control point and the communications network, said control point including a memory storing a database of rules and microprocessor programmed to parse the database and generate a search tree based upon bits selected from the database and said switch/router using the search tree to filter frames received from the communications network.

25. The communications system of claim 24 wherein the communications network may include the Internet.

26. The communications system of claim 25 further may include at least one workstation coupled directly or indirectly to the switch/router;
and may include at least one server coupled to said switch/router.

27. An interconnecting device comprising:
a housing;

a switch fabric mounted within said housing;

a plurality of network ports coupled to said switch fabric, wherein at least one of the network ports includes a packet classification system that includes a software managed tree generated from selected bits of a database of Rules, a controller including logic which parses an unknown Rule for bits similar to bits identified at nodes of the tree and, if found, searching the tree in a predetermined way until at least one Rule of the database of Rules is encountered wherein the at least one Rule is compared with the unknown Key to determine the action to apply to the packet represented by the Key.

28. The interconnecting device of claim 27 further including a Central Processing System coupled to said switch fabric.

29. A program product comprising:

a medium on which a computer program is recorded; said computer program including:

a first program code module implemented on said medium, said program code parsing a data base of rules and identifying therein at least one column with a0=the number of 0 entries, a1=the number of 1 entries, a*=the number of * entries and ab=the number of b entries, having most entries 0 or 1 and having about equal numbers of 0 and 1 entries;

a second program code module, operatively interacting with the first program code module, implemented on said media, said second program code partitioning said column into at least two new rules submatrices wherein the first one of the two new rule submatrices includes all rows from the original set of rules with 0, *, or b in the selected column and the second one of said two new rule submatrices includes all rows from the original set of rules with 1, *, or b in the selected column; and a third program code module, operatively interacting with the first and second program modules, implemented on said media, said third program code module repeating the partitioning procedure on submatrices until no submatric is left with a column containing both 0 and 1 in it.

* * * * *